March 3, 1964  D. L. BIESECKER  3,123,389
QUARTER TURN FASTENER
Filed July 25, 1960  2 Sheets-Sheet 1
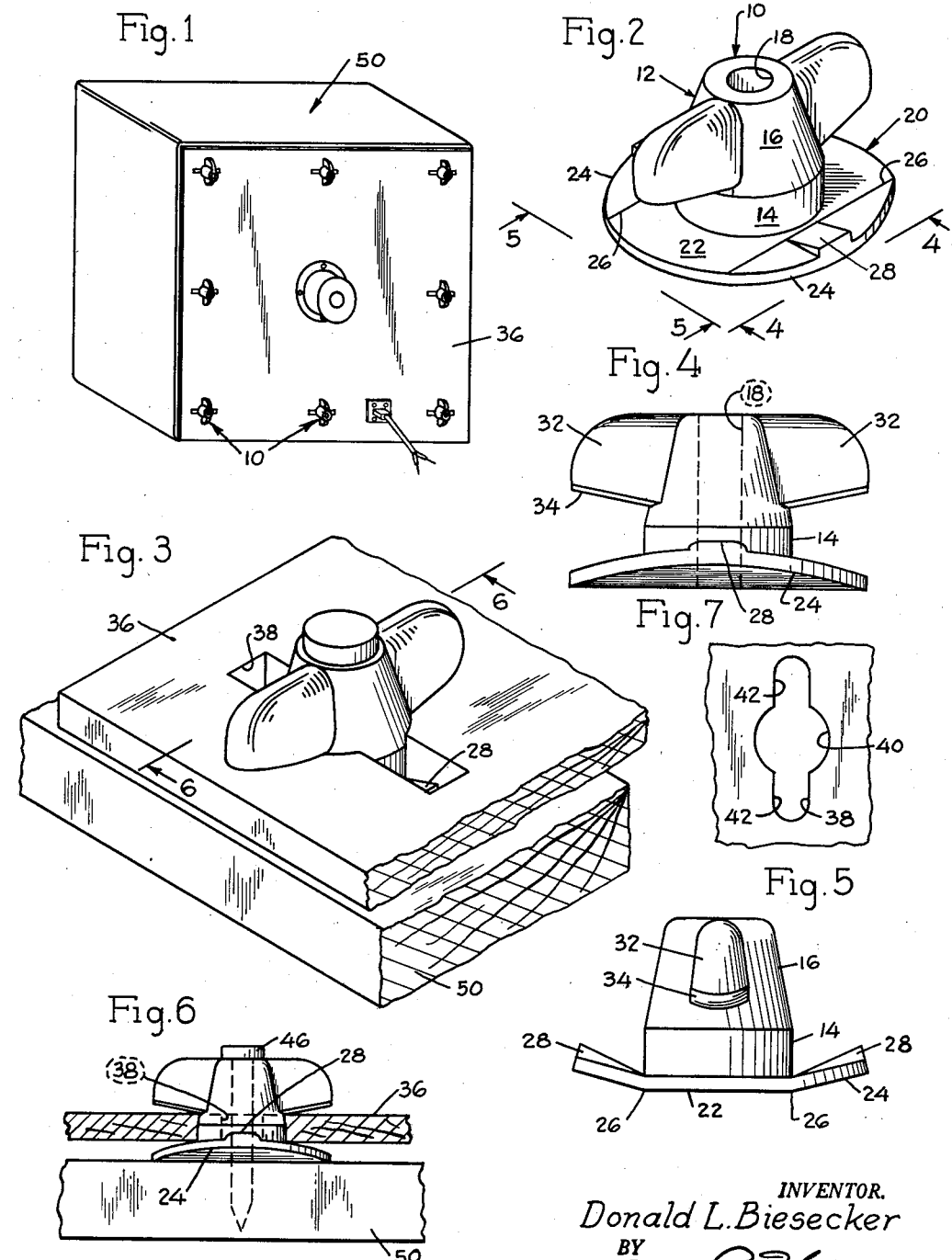
INVENTOR.
Donald L. Biesecker
BY
ATT'Y.

March 3, 1964  D. L. BIESECKER  3,123,389
QUARTER TURN FASTENER

Filed July 25, 1960  2 Sheets-Sheet 2

INVENTOR.
Donald L. Biesecker
BY
ATT'Y.

United States Patent Office 3,123,389
Patented Mar. 3, 1964

3,123,389
QUARTER TURN FASTENER
Donald L. Biesecker, Arlington Heights, Ill., assignor to Illinois Tool Works, Inc., Chicago, Ill., a corporation of Delaware
Filed July 25, 1960, Ser. No. 45,046
9 Claims. (Cl. 292—218)

This invention relates to an improved fastener. More particularly, it relates to a one piece plastic fastener especially adapted for use in maintaining panels in juxtaposition to a workpiece.

It is an object of this invention to provide an improved fastener which can be preassembled to a panel prior to installing same on a workpiece such as a TV cabinet. A further object of this invention is to provide an assembly of a panel, a fastener and a cabinet which does not require the use of jigs to preposition both parts relative to one another. A further object is to provide an improved one-piece plastic fastener for use with panel assemblies which is readily operable to permit quick removal of the panel to service the interior of the cabinet.

Still another object of the invention is to provide an improved one-piece plastic fastener which is capable of take-up to compensate for manufacturing tolerances in both the cabinet and panel and thereby prevent rattling. Such a fastener shall be operable by a quarter turn.

Referring now more particularly to the accompanying drawing wherein FIG. 1 shows a perspective view of a typical installation of a panel to the rear of a TV cabinet;

FIG. 2 is a perspective view of an embodiment of the present invention;

FIG. 3 is a perspective view of the same embodiment of the invention shown in installed position;

FIG. 4 is a frontal elevation taken along line 4—4 of FIG. 2;

FIG. 5 is an end elevation taken along line 5—5 of FIG. 2;

FIG. 6 is an elevation in partial section showing the installation in FIG. 3 as viewed along line 6—6;

FIG. 7 is a plan view of an aperture suitable for accepting such a fastener;

Figure 11:
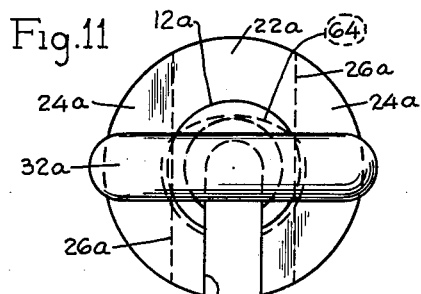
FIG. 11 is a bottom view of the embodiment shown in FIG. 8 when rotated 180 degrees.
Figure 12:
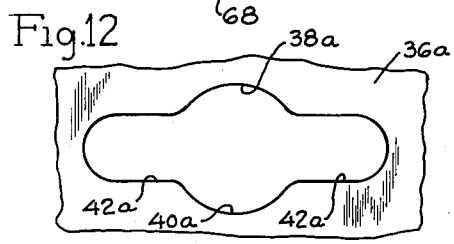
FIG. 12 is a plan view of an aperture suitable for accepting the embodiment shown in FIGS. 8 through 11.

Referring to FIGS. 1 through 6, the fastener 10 embodying the teachings of this invention includes a body 12 having a lower tubular portion 14 and an upper frusto-conical portion 16 integral therewith and tapering inwardly from its junction with portion 14 for purposes best set forth hereinafter. A bore 18 extends through the entire extent of the body 12 and is positioned coaxially therewith.

At the lower extremity of the tubular portion 14 is an integral base 20. Base 20 is generally circular in plan view but in section has a central generally rectangular portion 22 formed by a pair of parallel chords which are spaced apart a distance, in the present instance, slightly greater than the diameter of the tubular portion 14. The outer portions 24 of the base 20 are tilted upwardly and outwardly from their juncture with the rectangular portion along the chords 26. A pair of wedge shaped integral protuberances or detents 28 are each positioned perpendicularly to the chords 26 and extend upwardly from the upper surface of portions 24 respectively. Detents 28 are positioned oppositely to one another with their axis falling in a plane passing through the axis of the fastener and bore 18. They have their maximum thickness adjacent the edge of the outer portions 24 and taper downwardly to blend into the upper surface of rectangular portion 22 adjacent its connection to tubular portion 14. The function of detents 28 will be more adequately set forth hereinafter.

Extending laterally outwardly from frusto-conical portion 16 are a pair of integral wings 32. Wings 32, in section, may be tapered inwardly from their bottom towards their top and are preferably provided, as shown in FIG. 5, with a rounded or convex under surface 34. In addition, lower surface 34 is preferably tapered upwardly and outwardly from the point of juncture with portion 16 of the body, as best seen in FIG. 4, for reasons set forth hereinbelow.

To utilize a fastener of the type set forth in this embodiment, the fastener is preassembled with a panel 36 having a plurality of apertures 38 of the type shown in FIG. 7. Aperture 38 is generally a double key slot type having a central circular portion 40 and a pair of slots 42 communicating with opposite sides of the circular portion 40. The circular portion 40 is adapted to accept the tubular portion 14 of the body 12 while the extent of the opposed slots 42 is substantially equal to the radial extent of wings 32 whereby the fastener is axially acceptable and can be telescopically associated with said aperture 38. The fastener is inserted from the "blind" side of the panel by inserting the upper or frusto-conical portion 16 of wings 32 through the double slot aperture 38. The fastener is then rotated 90 degrees so that the wings overlie the panel adjacent to the circular portion of the aperture 40. The distance between the under surface 34 of the wings 32 and the upper surface of the rectangular portion 22, as measured adjacent the body 12, is substantially equal to or slightly greater than the thickness of panel 36. Variations in manufacturing of panel 36 are accommodated by the flexure of the resilient outer portions 24 which project upwardly beyond the upper surface of rectangular portion 22. As the wings 32 are rotated the lateral upward taper of the under surface 34 permits engagement adjacent the outer extremity first and, as rotation is continued, draws the fastener axially upwardly relative to the panel 36 until the detents 28 snap upwardly and protrude into the opposed slot portions 42 of the key slot aperture 38. With the fastener preassembled to the panel the panel is superimposed over the back side of the cabinet and a suitable stud fastener, in the present instance, a nail 46, acceptable within bore 18, is driven into the cabinet 50 until the head of the fastener 46 bears against the upper surface of body 12. To remove the panel 36 for servicing the interior of cabinet 50, the fastener 10 is rotated 90 degrees until its wings 32 are in registry with the slots 42 of the slot aperture 38 whence the panel 36 can be moved outwardly away from cabinet 50 along the axis of the fastener 10.

As can be seen the frusto-conical portion 16 of the body 12 and the side taper of the wings 32 assist in centering the key slot apertures 38 of the panel 36 relative to the fasteners when re-application is desired.

Figures 8, 9:
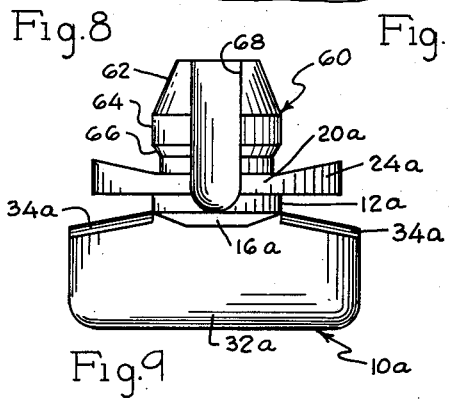
FIG. 8 is a frontal elevation of another embodiment of the invention.
FIG. 9 is an elevation in partial section of the embodiment shown in FIG. 8 in applied position.
Figure 10:
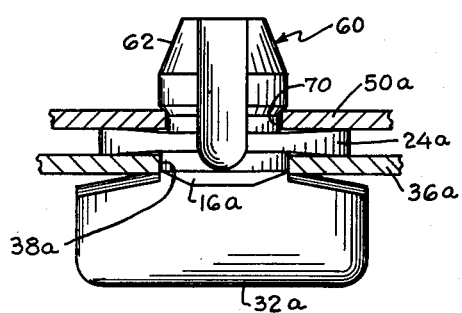
FIG. 10 is a side elevation of the embodiment shown in FIG. 8.

Another embodiment of the present invention is shown in FIGS. 8 through 12 wherein similar parts will be designated by similar numerals with the addition of the suffix "a." In this embodiment the fastener 10a has a body 12a of limited axial extent, integral with, and connected to base 20a. Extending upwardly and laterally beyond body 12a is the wing element 32a which is connected to body 12a by frusto-conical portions 16a. The lower surfaces 34a of wing element 32a are preferably tapered outwardly and downwardly away from their juncture with the body 12a as best seen in FIG. 8. Further, the lower surface 34a may be convex towards the base 20a as best seen in FIG. 10 so as to provide a dual direction camming surface. As in the first embodiment, the base 20a is generally circular in plan view having a generally rectangular central portion 22a and a pair of outer portions 24a which taper in thickness along an axis parallel to wing 32a, with the greatest thickness being present at the outer peripheral portion of base 20a in opposition to surfaces 34a. The rectangular portion 22a and outer portions 24a are defined by chords 26a.

The present embodiment differs from the first embodiment discussed in that the fastening means for retaining the fastener 10a to the workpiece 50a is integral with the fastener. The fastening means includes a stud 60 having a tapered nose 62, a cylindrical mid portion 64 and an undercut or shoulder 66. The stud 60 is further characterized in that it is provided with a slot 68 which may extend, as illustrated, along its entire axial extent and opens outwardly through one side of the stud to permit perimetral collapse of the stud 60 during insertion in a workpiece. In the present embodiment the radially communicating slot 68 extends outwardly through the base 20a to further enhance the resiliency of the fastener as a whole.

In the operation of this particular embodiment, the fastener can, if desired, be preassembled with panel 36a having a double key slotted aperture 38a. The radially extending portions of wing element 32a being acceptable within slots 42a which communicate with a circular central portion 40a adapted to accept the body 12a. Rotation of the fastener 10a through 90 degrees causes the wing element 32a to overlie the panel 36a adjacent to the central circular portion 40a. The workpiece 50a is provided with a circular aperture 70 which is smaller in diameter than central circular portion 64 of the stud 60 so that after assembly the shoulder 66 will rest against the underside of the workpiece 50a, as seen in FIG. 9. An alternative assembly means is to axially snap the fastener 10a through the workpiece 50a and to align the wing elements 32a in the proper direction for passage through the key slotted aperture 38a. It should be noted that when the stud 60 is inserted through aperture 70, it will perimetrally collapse and then expand when shoulder 66 has passed through aperture 70. Further, outer tapered portions 24a will flex along chords 26a to provide a cushion and spacer between the workpiece 50a and panel 36a, as best seen in FIG. 9. As in the first embodiment, the lateral taper of the undersurface 34a is directed upwardly and outwardly away from the base 20a in such a fashion that the distance between the base 20a and the juncture point of undersurface 34a with body 12a is substantially equal to the thickness of panel 36a. This embodiment is preferably injection molded from a suitable plastic material and, as best seen in FIG. 9, due to the resiliency of plastic materials, there might tend to be a slight compression of the outer portions 24a of base 20a as well as a slight compression of the convex surface of under portion 34a of the wing element 32a.

Figure 13:
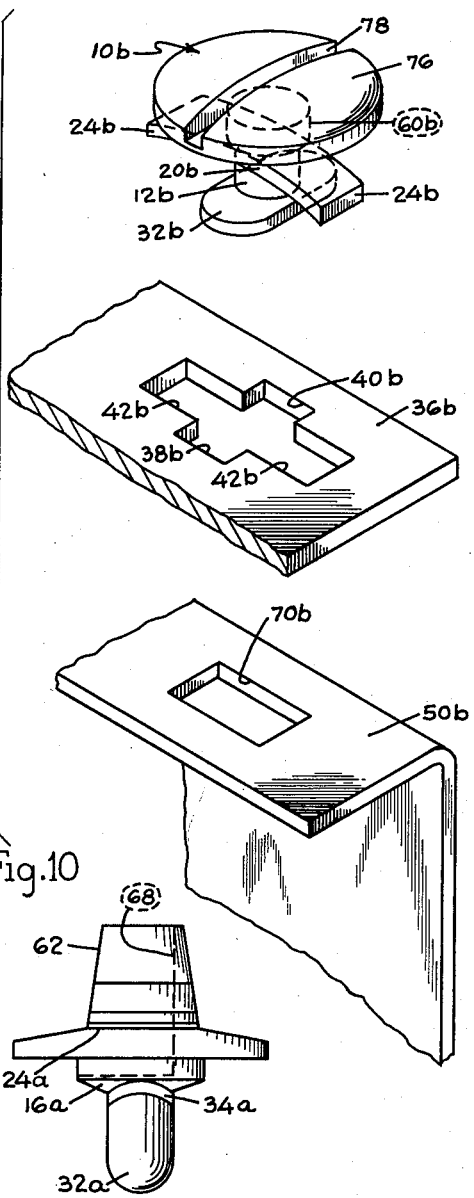
FIG. 13 is a perspective view of still another embodiment of the invention shown in exploded relation to the panel and workpiece with which it is associated.

Still another embodiment of the present invention is seen in exploded view in FIG. 13 wherein similar parts are designated by similar numerals with the addition of the suffix "b." This embodiment includes a body 12b integral with a base 20b, the latter having outer resilient portions 24b which are formed outwardly away from base 20b and in the direction of body 12b. The wing elements 32b in the present embodiment are spade like in nature and of short axial extent relative to the fastener as a whole. The stud 60b, extending integrally from base 20b in a direction opposite to body 12b, is provided at its opposite end with a head 76, spaced from the base 20b. Head 76 has a kerf 78 suitable for the acceptance of rotation inducing means such as a screw driver, not shown.

The workpiece 36b has a key slotted aperture 38b having a rectangular central portion 40b, of sufficient longitudinal extent to accept wing element 32b and opposed communicating slots 42b which are of sufficient combined axial extent to telescopically accept the pair of outer resilient flexible portions 24b. In installation the fastener is first axially inserted through aperture 38b and rotated 90 degrees. This causes outer portions 24b to underlie the panel 36b with the stud portion 60b extending through aperture 38b and head 76 overlying the upper side of panel 36b, as viewed in the drawing. With fastener 10b in this first position the wing elements 32b are in position to be telescopically accepted within workpiece 50b and its associated complementary aperture 70b. When the wing elements 32b and body 12b are telescoped through aperture 70b, rotation of the fastener a second increment of 90 degrees causes wing elements 32b to underlie the undersurface of workpiece 50b with the outer portions 24b overlying workpiece 50b. At the same time head 76 secures the panel 36b in juxtaposition to workpiece 50b. The outer portions 24b, because of their resilient characteristics tend to spring into slots 42b when the fastener is rotated the second 90 degree increment and thus lock the fastener in assembled relation against inadvertent retrograde rotation. In this embodiment the fastener 10b will remain rotatably assembled to the panel 36b when said panel is removed for access into the workpiece 50b.

Each of the embodiments described above can be injection molded from suitable plastic materials such as nylon, polyethylene or other plastics having the desired characteristics of resilience and strength necessary in such a fastener.

While three embodiments of the present invention have been discussed, it is felt that others will be apparent to those skilled in the art and it is my intent to be limited only by the appended claims.

I claim:

1. A one-piece dielectric plastic fastener for fastening an apertured panel to a workpiece including a base, a columnar body integral with and extending from said base, wings extending outwardly in fixed relationship from opposite sides of said body and spaced from said base, said wings being telescopically acceptable through said apertured panel, spring means extending laterally from said base in spaced opposition to said wings, stud means extending from said base in a direction opposite from the body, said stud means acting in cooperation with said body and wings to fasten said panel to said workpiece and said spring means acting as a resilient spacer between said panel and workpiece.

2. A device of the type claimed in claim 1 for use in an aperture workpiece wherein said stud means is formed integral with said fastener and includes a tapered nose portion, a cylindrical central portion and an undercut shoulder spaced from said base, said stud further including a radially oriented slot extending throughout the axial extent of the stud and communicating laterally through both the nose and side wall of the fastener whereby said stud means can be perimetrally collapsed when axially inserted within said workpiece aperture so that said shoulder means underlies the aperture and said base means overlies the workpiece.

3. A device of the type claimed in claim 1 wherein said columnar body, base and wings are provided with a coaxial bore passing through all parts of the fastener, said stud means being a separate element acceptable within said bore and extending outwardly from the end adjacent said base for acceptance in said workpiece.

4. A device of the type claimed in claim 3 wherein said stud means is a nail.

5. A device of the type claimed in claim 3 wherein said stud means is a screw.

6. A device of the type claimed in claim 1 wherein said stud means is integral with said base and is provided at its end remote from said base with a laterally extending head having a kerf on its outer surface.

7. An improved fastener for fastening a key slotted panel to a workpiece including a base, a columnar body integral with the base having a through bore which also traverses said base, wings extending outwardly from opposite sides of said body in spaced relation to said base and adapted in installed position to overlie said panel, spring means extending outwardly and upwardly from said base toward said wings and adapted to resiliently engage the opposite side of said panel, and stud means traversing said bore and rotatably retaining said fastener with its base abutting said workpiece.

8. A fastener installation including a cabinet, a cover panel to be attached to said cabinet, a plurality of circular apertures positioned around said panel and having opposed communicating slots forming double key holes, a plurality of one piece plastic fasteners adapted to be preassembled with the panel prior to attachment to the cabinet for retaining said panel to the cabinet, each of said fasteners including a tubular body having a lower cylindrical portion and connected thereto an upper frusto-conical portion, a pair of wing elements attached to and extending outwardly from opposite sides of said upper portion, the undersurface of each of said wings extending upwardly and outwardly toward the free end away from the juncture with said body, said undersurface in section being convex downwardly, a base substantially circular in plan attached to the free end of the lower cylindrical portion of said body and having a radius substantially equal to or greater than the radial extent of said wings, said base having a central substantially rectangular planar portion extending laterally in the same direction as said wings and a pair of oppositely extending side resilient portions extending upwardly from said planar portion generally perpendicular to the directon of said wings with the juncture lines of said side portions with said central portion defined by a pair of substantially parallel chords, a tapered thickness abutment on each of said side resilient portions having a width substantially equal to the width of said connecting slots in the double key holes, said abutments being positioned circumferentially on said side portions intermediate said wings and having a combined diametral extent less than the length of said slots, an axial through bore extending through both said body and said base, said fasteners adapted to be inserted wings first through said slots and turned 90 degrees until said abutments snap into said slots and the wings overlie the panel, a nail fastener adapted to be rotatably accepted through said bore and driven into said cabinet when said preassembled fasteners and panel are positioned against said cabinet with said base resiliently interposed between said cabinet and panel, whereby 90 degree rotation of each fastener will align said wings with said slots while compressing said resilient portions and permit ready removal of said panel.

9. A fastener installation including a cabinet, a cover panel to be attached to said cabinet, said cabinet having a plurality of circular apertures positioned around and adjacent to an opening in said cabinet, a plurality of double key slot apertures equal in number to the cabinet apertures positioned about said panel, a plurality of one piece plastic fasteners adapted to be preassembled with said panel prior to attachment to said cabinet for retaining said panel to the cabinet, each of said fasteners including a body, a pair of wing elements extending outwardly adjacent one end and from opposite sides of said body, the undersurface of each of said wings on the side adjacent the body extending upwardly and outwardly toward their free ends away from the juncture with said body, said undersurface further being convex in section, a base substantially circular in plan integral with said body and spaced from said wings and having a radius less than the radial extent of said wings but greater than the minor dimension of said key slot, said base having a central substantially rectangular planar portion defined by a pair of chords bisecting said base in spaced parallel relation, and a pair of oppositely disposed resilient portions joined to said base along said chords and shaped to form the remainder of said circle, said opposed resilient portions tapering in thickness from their juncture with said rectangular portion and having their greatest thickness at the perimeter most distant from said chords, a stud portion formed integral with said fastener adapted for acceptance in the cabinet apertures and extending from said base coaxially with and oppositely from said body and wings, said stud including a tapered nose portion, a cylindrical central portion and an undercut shoulder spaced from and facing said base, said stud further including a radially orientated slot extending throughout the axial length of the stud and communicating laterally through both the nose and the side walls of the various stud portions whereby said stud means can be perimetrally collapsed when axially telescoped through said circular cabinet apertures so that said shoulder means underlies the aperture and said base means overlies the cabinet, each fastener adapted to have its wing elements telescopically accepted within a double key slot in the panel and to be rotated within said key slots with said wings overlying the minor dimension of the key slot and with said base resiliently interposed between said cabinet and panel and acting as a spacer and insulator, said panel being readily removable when said wing elements are rotatively aligned with the complementary key slots in said panel while said stud rotatably retains the fastener in the cabinet.

References Cited in the file of this patent
UNITED STATES PATENTS

| | | |
|---|---|---|
| 148,104 | Bannihr et al. | Mar. 3, 1874 |
| 289,991 | Curtis | Dec. 1, 1883 |
| 613,829 | Uhlmann | Nov. 8, 1898 |
| 1,931,707 | Quigan | Oct. 24, 1933 |
| 2,601,213 | Poupitch | June 17, 1952 |
| 2,826,755 | Aiken | Mar. 11, 1958 |